US 6,328,798 B1

(12) United States Patent
Bostrom et al.

(10) Patent No.: US 6,328,798 B1
(45) Date of Patent: Dec. 11, 2001

(54) COATED POLYMERIC PARTICLES HAVING IMPROVED ANTI-BLOCK CHARACTERISTICS, METHOD OF MAKING SUCH PARTICLES, AND APPARATUS THEREFOR

(75) Inventors: David O. Bostrom, Cincinnati; William K. Shumake, Middletown; Paul H. Jackson, Loveland, all of OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/253,827

(22) Filed: Feb. 19, 1999

(51) Int. Cl.⁷ .................. B05C 5/00; B01F 7/04
(52) U.S. Cl. ........................ 118/303; 118/24
(58) Field of Search .................. 118/303, 24, 30, 118/612, 326, DIG. 2; 427/4, 212

(56) References Cited

U.S. PATENT DOCUMENTS

| | | |
|---|---|---|
| 3,528,841 | 9/1970 | Donaldson et al. . |
| 4,169,128 * | 9/1979 | Sinor et al. ............ 422/224 |
| 4,359,492 | 11/1982 | Schlademan . |
| 4,511,603 | 4/1985 | Wallace . |
| 4,528,155 * | 7/1985 | Elder ................. 264/174 |
| 4,774,138 | 9/1988 | Gardenier et al. . |
| 5,230,735 | 7/1993 | Murata et al. . |
| 5,401,534 * | 3/1995 | Bourreau ............. 427/212 |
| 5,811,038 * | 9/1998 | Mitchell ............. 264/40.7 |
| 5,869,555 | 2/1999 | Simmons et al. . |
| 5,942,569 | 8/1999 | Simmons et al. . |
| 6,067,776 | 5/2000 | Heuer et al. . |
| 6,120,899 | 9/2000 | Cameron et al. . |

FOREIGN PATENT DOCUMENTS

| | | |
|---|---|---|
| 384419 | 2/1965 | (CH) . |
| 0 115 307 | 8/1984 | (EP) . |
| 0 312 367 | 4/1989 | (EP) . |
| 1 378 222 | 12/1974 | (GB) . |
| 2093376 | 9/1982 | (GB) . |
| 2 142 255A | 1/1985 | (GB) . |
| 8301910 | 6/1983 | (WO) . |
| 8402530 | 7/1984 | (WO) . |
| WO 96/00747 | 1/1996 | (WO) . |
| WO 97/19582 | 6/1997 | (WO) . |

* cited by examiner

Primary Examiner—Richard Crispino
Assistant Examiner—Y. T. Tadesse
(74) Attorney, Agent, or Firm—Wood, Herron & Evans L.L.P.

(57) ABSTRACT

To provide superior anti-agglomeration, or tackiness-reducing, properties, one aspect of the invention is directed to coated polymeric particles, with each of the coated particles comprised of a polymeric substrate particle and a block-reducing coating on the surface of the substrate particle. The coating includes polymeric coating particles which advantageously may be in the form of a micro-fine powder. Also disclosed herein is a process for applying the polymeric coating particles onto the polymeric substrate particles, as well as equipment which is especially useful in producing the coated polymeric particles.

8 Claims, 3 Drawing Sheets

FIG. 3

Figure 1A:
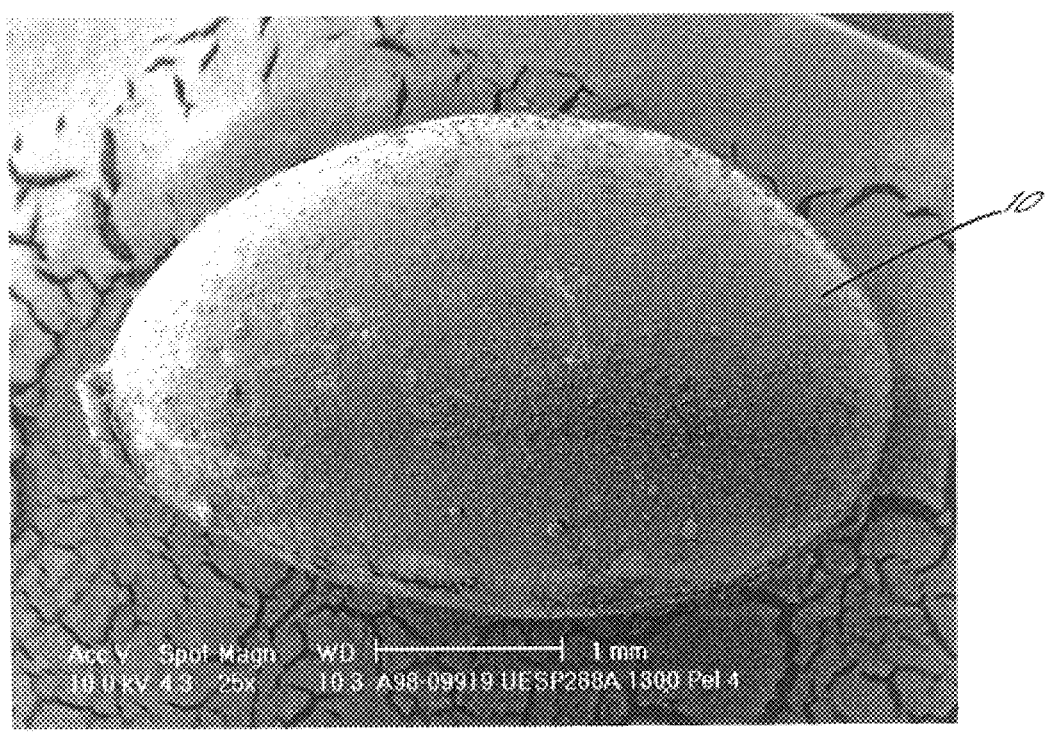
Figure 1B:
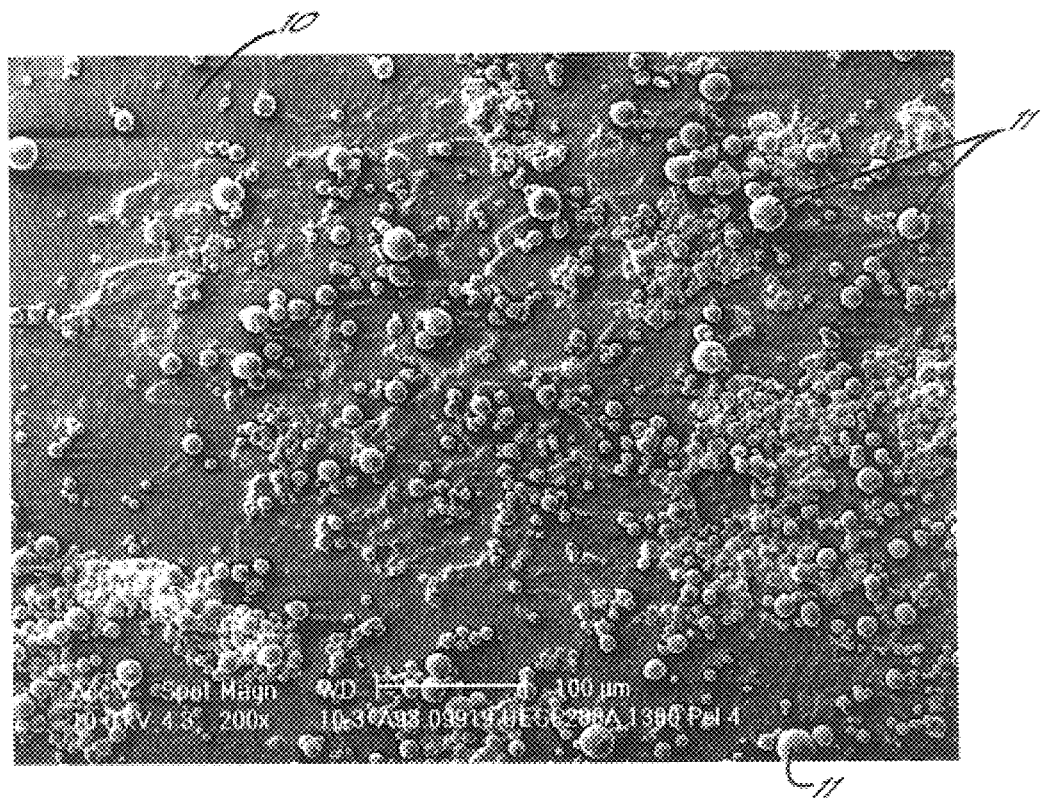

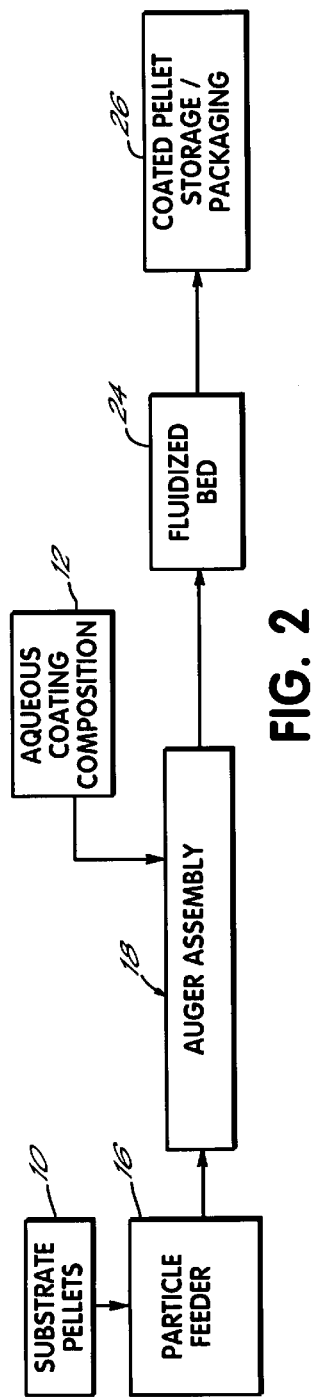
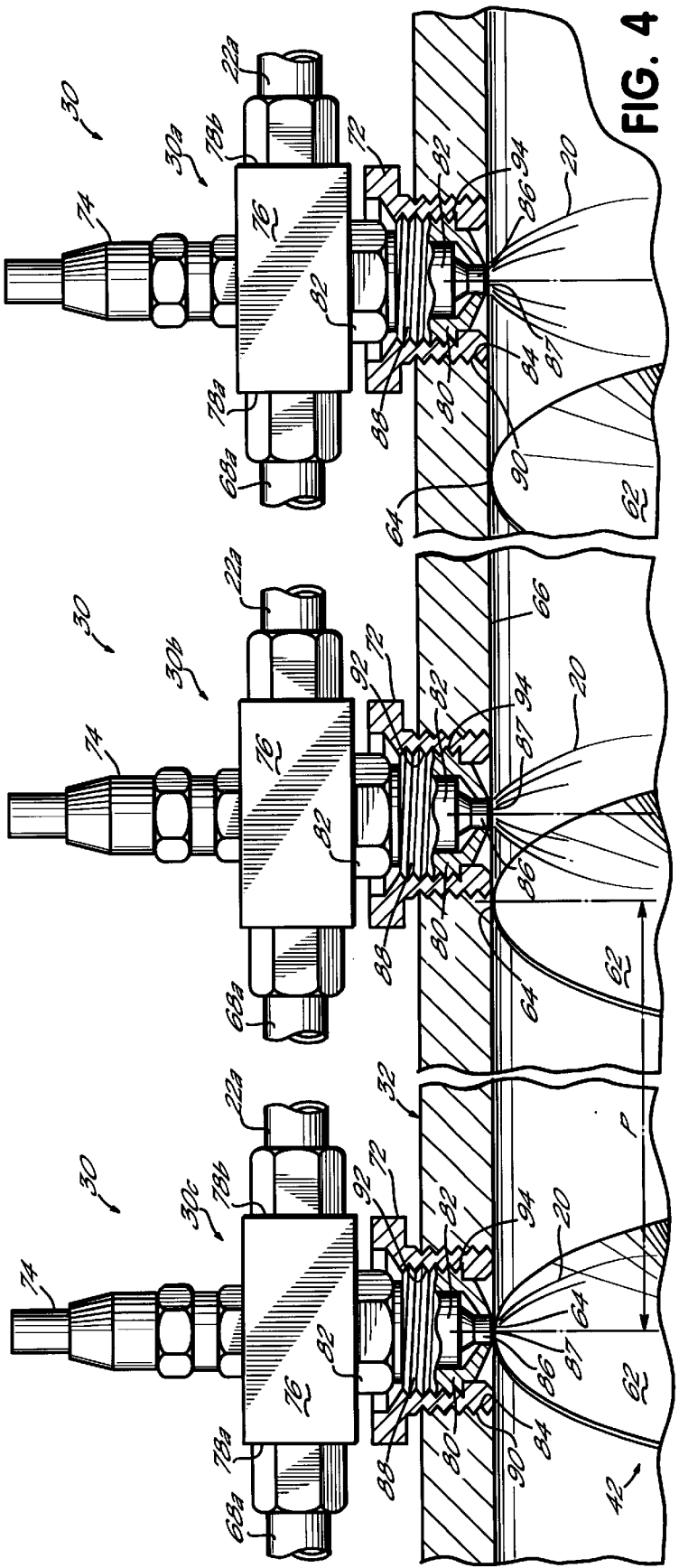

COATED POLYMERIC PARTICLES HAVING IMPROVED ANTI-BLOCK CHARACTERISTICS, METHOD OF MAKING SUCH PARTICLES, AND APPARATUS THEREFOR

BACKGROUND OF THE INVENTION

Field of the Invention

The invention relates to polymeric particles having a coating which provides improved anti-blocking properties, and to a method of manufacturing the coated polymeric particles. The invention also encompasses equipment used in manufacturing the coated polymeric particles.

A variety of polymeric materials are produced from an initial reaction sequence at elevated temperatures and pressures. The resulting polymeric materials exist in a molten form. The polymeric materials may be further processed directly from the molten phase, or be cooled to ambient temperature prior to further processing. Depending on processing conditions and composition of the reactants, the cooled polymeric materials may be converted to pellets or other physical forms which may be easily packaged or may be first cooled and then ground, chopped or otherwise processed prior to further processing of the material. Some polymeric materials, by the nature of their composition, tend to exhibit cold-flow properties. Examples of such polymeric materials are ethylene vinyl acetate, very low density polyethylene (i.e., polyethylene with a density of 0.90 grams per cubic centimeter or less), ethylene methyl acrylate, and ethylene n-butyl acrylate. These materials, even though previously processed to produce particulate units, such as pellets, chips or powders, will nonetheless tend to flow at ambient temperatures and pressures. The particles, after cold-flow, tend to agglomerate to form a single mass which is difficult to reinstitute into the component pellets, granules or the like. It is highly preferred that polymeric materials which exhibit these cold-flow tendencies continue to have free-flowing characteristics.

Various attempts have been made to provide a surface coating to polymeric particles to limit or eliminate the tendency to agglomerate. To this end, materials such as bisoleamide have been incorporated into the polymer reaction mixture prior to formation of the polymer particle. The bisoleamide is not miscible with the polymeric material and, in time, migrates to the surface of the particle to provide a coating which resists agglomeration. It has also been known to coat silica and talc powders onto the surface of a polymer particle to inhibit agglomeration.

It is also known to apply a micro-fine polyolefin powder coating onto polymeric pellets to decrease the tackiness of the pellets. The micro-fine powder can be applied by incorporating the powder into the chilled water of an underwater pelletizing device which cools the pellets cut after extrusion. Alternatively, the micro-fine powder can be coated onto formed polymer pellets by tumbling, airveying or the like. Also, the coating may be applied by electrostatically charging a bath of fluidized powder with an electrical potential different from that of the polymer pellets.

In the preparation of polymeric particles having improved anti-agglomeration properties, there remains a need for a product which not only exhibits superior anti-agglomeration properties following treatment with a coating material, but also retains this property after pack(aging, transport, and in further processing.

SUMMARY OF THE INVENTION

To provide superior anti-agglomeration, or tackiness-reducing, properties, one aspect of the invention is directed to coated polymeric particles, with each of the coated particles comprised of a polymeric substrate particle and a block-reducing coating on the surface of the substrate particle. The coating includes polymeric coating particles which advantageously may be in the form of a micro-fine powder. Also disclosed herein is a process for applying the polymeric coating particles onto the polymeric substrate particles, as well as equipment which is especially useful in producing the coated polymeric particles.

The coated polymeric particles may be produced by incorporating the polymeric coating particles into an aqueous coating composition and applying the composition to the surface of the substrate particles such as by spraying. The resulting coated particles then may be subjected to a drying step, such as in a fluidized bed, to remove substantially all traces of water and other volatile components from the coated particles.

The method of forming the coated particles may include introducing polymeric substrate particles into an auger assembly which conveys the substrate particles through a spray zone to an outlet zone. During operation of the auger assembly, the substrate particles are sprayed with an aqueous coating composition as the particles are mechanically mixed while being conveyed forward. From the outlet zone, the resulting coated particles may be conveyed to a drying apparatus such as a fluidized bed. The fluidized bed operates at elevated temperatures and provides an air flow which thoroughly agitates the coated particles. This combination of elevated temperature and agitating air flow removes water and other volatile components. The coated particles thereafter are cooled and transferred to a packaging or storage station. Preferably, the coated particles are cooled in a downstream section of the fluidized bed prior to transfer to the packaging or storage station.

If desired, the auger assembly may include a screw mounted inside a chamber, preferably such as a barrel, wherein the outer diameter of the screw is slightly less than the inside diameter of the barrel to thereby provide minimal clearance between the crest(s) of the screw helical flight(s) and the interior wall of the barrel. This arrangement substantially prevents backflow of particles toward the inlet of the auger assembly. If desired, the screw diameter and screw pitch may be uniform along the length of the screw, although this is not required. The pitch is the length of a longitudinal section of the shaft of the screw occupied by a flight, a flight being any full, 360 degree rotation of the spiral-like portion of the screw which extends radially outward from the shaft of the screw. At least one spray head is mounted to introduce aqueous coating composition into the barrel. In another aspect of the invention, the barrel of the auger is fitted with at least two spray heads for introducing the aqueous coating composition containing the polymeric coating particles into the barrel and into contact with the polymeric substrate particles. In an embodiment of the auger assembly where two or more spray heads are employed, the screw has a uniform pitch along its length, and the spray heads are positioned in a straight line on the barrel parallel with the longitudinal axis of the screw and of the barrel, the distance along the longitudinal axis of the barrel between spray heads is advantageously a non-integral multiple of the pitch of the screw. With the spray heads configured in this way, the flow of aqueous coating composition through the spray heads into the barrel is never completely interrupted during rotation of the screw.

In a further aspect of the invention, the spray heads are mounted so that the orifice of each spray head nozzle is substantially flush with the interior cylindrical surface of the barrel. In this fashion, the movement of crests of the screw, the particles, or both, across the flush-mounted spray heads minimizes the formation of coating composition solids build-up inside the auger assembly. As a result, auger assembly downtime is minimized and the substrate particles are more uniformly coated with the desired concentration of polymeric coating particles.

BRIEF DESCRIPTION OF THE DRAWINGS

The teachings of this invention are described in more detail in the following description and in the drawings, in which FIG. 1A is a scanning electron micrograph (SEM) of a coated pellet made in accordance with the principles of the invention;

FIG. 1B is a scanning electron micrograph (SEM) of a portion of the coated pellet of FIG. 1A;

FIG. 2 is a block diagram of a process for producing coated pellets in accordance with the principles of the invention;

FIG. 3 is an enlarged, partial cross-sectional view of a particle feeder and auger assembly according to the principles of the invention; and FIG. 4 is an enlarged, partial cross-sectional view of several spray heads mounted to the auger assembly of FIG. 3.

DETAILED DESCRIPTION OF PREFERRED EMBODIMENTS OF THE INVENTION

One aspect of the invention is directed to a coated polymeric particle having improved anti-block characteristics including a polymeric substrate particle and a block-reducing coating on the surface of the polymeric substrate particle, the block-reducing coating comprised of polymeric coating particles.

The term "particle", as used herein, refers to the physical form or shape of the polymeric materials of the invention, and includes, for example, a pellet, granule, chip, powder, flake, sphere, or any other form or shape suitable for use as either a substrate or a coating material.

In another aspect of the invention, the substrate particle and coating particles are formed of a polymer derived from the same monomer, comonomer or termonomer system to manufacture the ultimate polymer. The common monomer, comonomer or termonomer system is identified herein as the "chemical family". Also, as used herein, the term "polymer" encompasses homopolymers, copolymers, and terpolymers. The feature of producing a coated particle from substrate and coating particles of the same chemical family offers several benefits, including, for example, a resulting coated polymeric particle with enhanced predictability of subsequent processing and performance characteristics. By way of nonlimiting example, distinct chemical families, as used in conjunction with the invention, include: ethylene vinyl acetate, ethylene vinyl acetate polyisobutylene, ethylene maleic anhydride, ethylene methyl acrylate, ethylene butyl acrylate, polyethylene, styrene butadiene, silane, ethylene polypropylene diene, polyurethane, polyisobutylene, butyl rubber, and combinations thereof.

The polymeric coating particles generally have an average diameter substantially smaller than that of the polymeric substrate particle. For example, the average diameter of the polymeric coating particles preferably is 100 microns or less, more preferably 30 microns or less, and most preferably 20 microns or less. In one aspect of the invention, the polymeric coating particles have an average diameter in the range of 10 microns to 30 microns. In contrast the polymeric substrate particle has a generally spherical shape with a diameter in the range of about 90 mils to 150 mils, with a preferred particle diameter of 125 mils when the substrate particle is in the form of a pellet.

The polymeric coating particles are coated onto the polymeric substrate particle by application of an aqueous coating composition containing the polymeric coating particles. The composition advantageously may be comprised of a binder material such as an emulsifiable wax, a base such as potassium hydroxide, surfactants, an antimicrobial agent, an antifoam agent, polymeric coating particles, and deionized water. One factor in determining the maximum concentration of polymeric coating particles in the composition is the viscosity of the composition. More specifically, depending upon how the composition is applied to the substrate particles, the composition's viscosity should be low enough to allow the composition to be pumped through an application system and to flow satisfactorily over the polymeric substrate particles.

If desired, a carrier system commercially available from the Eastman Chemical Company, Kingsport, Tenn. may be used to advantage in formulating the aqueous coating composition. The particular carrier system is sold under the product name Aquastab®, and typically includes the following components:

TABLE 1

| Component | % (by weight) |
|---|---|
| Carrier Components | 50–75 |
| Binder material | 3–8 |
| Surfactants | 2–4 |
| Potassium hydroxide | 0.1–0.2 |
| Antifoam additive | 0.2–0.4 |
| Antimicrobial agent | 0.001–0.2 |
| Deionized water | 37–63.2 |
| Polymeric additive(s) | 25–50 |

When such an Aquastab® carrier system is employed, the polymeric coating particles are combined with the carrier components listed in Table 1 to form the aqueous coating composition. The process of preparing such coating compositions, and representative coating compositions, are described in more detail in U.S. Pat. Nos.: 4,880,470; 4,898,616; 4,960,644; 4,975,120; 5,007,961; 5,041,251; 5,096,493; 5,190,579; 5,334,644; and 5,443,910, the entire disclosure of each of these patents being incorporated herein in its entirety by reference.

One particularly suitable aqueous coating composition includes an ethylene-vinyl acetate copolymer (EVA) powder, such as Microthene® FE 532-00 commercially available from Equistar Chemicals, LP, Cincinnati, Ohio, dispersed in an aqueous emulsion containing carrier components such as those listed in Table 1. The Microthene FE 532-00 coating particles are substantially spherical in shape. The EVA powder comprises approximately 40% by weight of the total aqueous coating composition. With respect to physical characteristics, this composition has a white to off-white appearance, a pH in the range of 7 to 10, an amount of water in the range of 47.1% to 48.1% by weight and an amount of Microthene® FE 532-00 in the range of 39.5% to 40.5% by weight. In addition, the composition has the following viscosity/dilution curve characteristics: where the Microthene® FE 532-00 EVA powder is present in an amount of 40% by weight, the viscosity, as measured in centipoise (cP) units, is typically 30.6; at a concentration of 35% by weight, the viscosity usually is 14.9; at a concentration of 30% by weight, the viscosity typically is 9.1; and at a concentration of 25% by weight, the viscosity generally is 6.7.

The polymeric material of the substrate particle which has improved anti-block properties after application of coating particles may have a melt index of at least 15 grams per ten minutes (g/10 min), preferably 150 g/10 min, and most preferably 150 to 800 g/10 min. The melt index is measured by employing ASTM No. D 1238 which is incorporated herein in its entirety by reference.

By utilizing coating particles having a composition of the same chemical family as the substrate particles, the resulting coated polymeric particles offer an enhanced degree of predictability and purity in subsequent processing. By way of non-limiting example, the above aqueous coating composition has imparted superior anti-blocking properties to EVA substrate pellets such as Ultrathene®UE 653-04 pellets available from Equistar Chemicals, LP, Cincinnati, Ohio, as described in more detail below. Though the contact area between pellet and coating particle is small relative to the respective diameters of the pellet and coating particle, an anti-block coating is provided which resists removal by vibration, contact with adjacent coated pellets, and contact with the walls of the particular transfer and storage equipment. While beneficial anti-block results may be achieved with EVA substrate particles having a range of vinyl acetate concentrations, beneficial results may be achieved by applying coating particles to EVA substrate particles having at least about 18% by weight vinyl acetate, advantageously where the substrate particles have at least about 22% by weight vinyl acetate, and more advantageously where the substrate particles have at least about 25% by weight vinyl acetate. Additionally, increasingly beneficial results may be observed in connection with applying coating particles to EVA substrate particles having a melt index of at least 25 grams per ten minutes (g/10 min), at least 100 g/10 min, at least 400 g/10 min, and a range of 150 to 800 g/10 min. The tendency of EVA substrate particles to block increases with increasing melt index and vinyl acetate content. This increasing blocking tendency will also be found in substrate particles of other chemical families as the melt index increases. It is thus expected that greater improvements in anti-blocking properties will be found by applying the coating particles of the invention to substrate particles having a greater initial tendency to block.

In addition, when ethylene vinyl acetate polymeric coating particles are used, it is advantageous to employ coating particles having a vinyl acetate concentration of at least 4% by weight vinyl acetate, preferably from 4% to 12% by weight. In addition increasingly beneficial results may be realized when the EVA coating particles have a melt index of at least about 3 grams per ten minutes (g/10 min), preferably about 8 g/10 min. Generally, the upper melt index limit for the coating particle is about 200 g/10 min.

Where the polymeric substrate particle is a pellet, the pellet may be produced by one of several known pelletization techniques. As described herein pellets are formed by extruding molten polymeric material through an extruder head and cutting the individual pellets in a chilled water bath. The wet pellets are substantially completely dried by removal of more than 99% of the water, such as in a spin dryer. The pellets are then conveyed to the hopper of an auger assembly, with any agglomerates of the pellets being broken up by an agitator in the hopper. The pellets are then conveyed through the auger assembly barrel by a rotating screw and subjected to an aqueous coating composition spray from at least one spray head flush mounted on the inside diameter of the barrel. The auger assembly operates at ambient temperature and pressure, and the screw operates at a speed dependent on the output rate of the polymerization reaction, but is generally configured to operate in the range of about 45 to about 70 revolutions per minute. The agitator operates at approximately one third the speed of the auger screw, or at about 20 revolutions per minute. Optionally, a small quantity of polymeric coating particles is introduced into the underwater pelletizer water, typically about 0.05% by weight of the underwater pelletizer water, to promote flow of the substrate pellets.

The concentration of coating particles on a 100% solids basis is typically from about 2,000 to about 10,000 ppm based on the weight of pellets processed through the auger assembly. The preferred coating rate is about 4,000 ppm on a 100% solids basis of coating particles. The aqueous coating composition containing ethylene vinyl acetate coating powder and having the proper operating viscosity may contain up to about 40% coating particles. Thus, at the preferred coating rate the aqueous coating composition is applied at a rate of 1% by weight of the pellets processed through the auger assembly. The aqueous coatings composition may also be applied after dilution with additional water. The coating particle content of the aqueous coating composition generally ranges from about 20% to about 40%.

It can be appreciated that the coating particles are advantageously applied to improve the anti-block characteristics of the substrate particle. The concentration of the coating particles to impart the desired anti-block characteristics will vary as a function of the size and shape of both the substrate and coating particles, the composition of both the substrate and coating particles, and the tendency of the uncoated substrate particles to block. Thus, actual acceptable coating particle concentrations may vary from the above typical range.

In a further aspect of the invention, the aqueous coating composition containing the polymeric coating particles advantageously is applied to the polymeric substrate particle through at least one spray head which is flush-mounted on the barrel of an auger assembly into which the polymeric substrate particles are introduced. Generally, the polymeric substrate particles are introduced into an auger assembly operating at ambient temperature and pressure via a hopper or inlet chamber. However, the auger assembly may alternatively be cooled to further decrease the tendency of the substrate particles to stick to each other or the walls of the auger assembly. The substrate particles then come into contact with the aqueous coating composition while being conveyed through a chamber, such as a barrel, by the screw. An advantage of the use of a screw or similar device is that the substrate particles and aqueous coating composition become more completely mixed as the particles are transferred along the chamber and contact other particles. Preferably, at least two spray heads are utilized. When oriented in a straight line parallel with the axis of the barrel, the spray heads are spaced apart a distance which is a non-integral multiple of the pitch of the screw where the screw pitch is constant. This spacing ensures that the introduction of the aqueous coating composition into the interior of the auger barrel will not be completely interrupted at any time, as the individual crests of the screw pass across the individual spray heads. Alternatively, the spray heads may be positioned so that the heads are not oriented in a straight line parallel with the barrel's longitudinal axis. Moreover, the spray heads may be mounted in any orientation about the circumferential sidewall of the barrel. In this orientation, the heads again are preferably positioned so that the flow of aqueous coating composition is not completely interrupted when the crest of a helical flight passes across an individual spray head. Also, the crest thickness of individual helical flights of the screw in the vicinity of a spray head may be narrowed so that interruption of liquid flow through the spray head is minimized. It is also contemplated that the screw pitch may vary, and in this embodiment, the spray head(s) would be mounted such that flow of aqueous coating composition into the barrel is not completely interrupted when the flight crests pass across the spray head(s). In addition, though the substrate particles are coated and transferred preferably along a closed conveyance or chamber having a single inlet and a single outlet, such as a barrel, any suitable chamber may be used. For example, it is contemplated that the conveyance may include openings in addition to the inlet and outlet, and may for example have a continuous open upper portion wherein the conveyance approximates a trough in appearance. Where the conveyance is open to the environment, overspray may occur, and thus additional containment measures may need to be taken.

Where a closed conveyance such as a barrel is used, the flush-mounting of the spray heads at the inside diameter of the barrel and the close spacing between screw crests and inside barrel diameter minimize the build-up of aqueous coating composition in the vicinity of the spray heads. As a result, the coating operation can operate on a substantially continuous basis. If cleaning is required, a water flush is generally a sufficient treatment, involving minimum equipment down time.

The diameter of the spray head orifice through which the emulsion is applied is preferably at least twice the average diameter of the polymeric coating particles so as to minimize the risk of plugging.

After the substrate particles are coated in the auger assembly, the water and any residual volatile emulsion or particle components are driven off in a fluidized bed, which tumbles the coated pellets at an elevated temperature and air flow, followed by passage through a cooling region in the fluidized bed, prior to outputting the dried coated pellets to transfer equipment. It is believed that a substantial portion of the non-aqueous emulsion components, other than the coating particles, is volatilized and removed from the coated particles. It is believed that at least a portion of the bonding needed to maintain the coating particles on a substrate particle is attributed to the emulsifiable wax component of the emulsion. Where the substrate and coating particles are produced from a polar polymer, ionic and/or covalent bonding may also contribute to maintaining the coating particles on the particular substrate particle. In addition, weak hydrogen bonding effects may also contribute to maintaining the bond of coating particles onto the substrate particle.

In one version of the invention, the coating particles represent at least 0.3%, at least 0.4%, or at least 0.5% by weight of the coated polymeric particle. Though coating particle levels greater than 0.5% by weight may be utilized, the improvement in anti-block properties measured by stick temperature (discussed in detail below) tends to increase at a slower, non-correlatable rate.

As indicated above, improvements in anti-block properties are evaluated by measuring the stick temperature of coated particles. It has been found that the coated particles of the invention exhibit at least a 20% improvement in stick temperature compared to the uncoated substrate particle, preferably a 40% improvement, and most preferably at least a 60% improvement.

Referring to FIGS. 1A and 1B, a coated polymeric pellet formed according to the principles of the invention is shown. In FIG. 1A, the length of the micron bar represents one millimeter, and in FIG. 1B, the length of the micron bar represents 100 micrometers. The coated pellet includes an Ultrathene®UE 653-04 ethylene-vinyl acetate copolymer (EVA) substrate pellet having a block-reducing surface coating, with the surface coating including polymeric coating particles in the form of Microthene® FE 532-00 EVA powder, the coating particles representing about 0.40% by weight (i.e., 4000 ppm) of the total weight of the coated pellet shown. This particular substrate pellet has a generally egg-like shape, while the block-reducing EVA powder particles are generally spherical.

Referring to FIG. 2, substrate pellets 10 are conveyed to a substrate pellet feeder 16 for introduction into an auger assembly 18 which will be described in more detail below, with reference to FIGS. 3 and 4. The aqueous coating composition 12 is applied to the surface of the pellets 10 in the auger assembly 18. The coated pellets (not shown) are then dried in a fluidized bed, where they are exposed to an elevated temperature and a high-velocity air flow, which serve to thoroughly agitate the coated pellets while water and volatile components are removed from the coated pellets. The dried, coated pellets are then cooled, preferably in a down-stream section of the fluidized bed 24, prior to transfer to a coated pellet storage/packaging station 26 or other appropriate processing station.

In an alkaline environment, certain antioxidants such as butylated hydroxytoluene (BHT) will discolor, imparting a typically yellow color to the coated particle. It has been found that the combination of spray coating in an auger assembly with fluidized bed drying/agitating, as described in more detail below, tends to minimize formation of color bodies on the coated particle.

Referring to FIG. 3, several spray heads 30 are mounted on the auger assembly 18, and more specifically, on a chamber referred to as a barrel 32, with the spray heads 30 used to spray the aqueous coating composition 12 onto the substrate pellets 10 as they move through the auger assembly 18. The substrate pellets 10 are fed into the particle feeder 16 through an inlet port 34, where they pass to a feeder section 36. The pellets 10 fall by gravity from the feeder section 36 into an agitator chamber 38. An agitator 44 is mounted within the agitator chamber 38 and preferably includes several helically shaped blades 46 projecting from a shaft 48 which extends into the agitator chamber 38. The shaft 48 is rotationally driven by a motor and transmission unit 50 mounted externally on a wall 52 of the agitator chamber 38. The motor and transmission unit 50 also has a junction box 54 mounted to the unit 50.

Positioned below the agitator chamber 38 is an inlet section 40 of the auger assembly 18, with the section 40 for introduction of the pellets 10 to a screw 42 mounted generally horizontally within the auger assembly 18. The screw 42 is rotationally driven by a motor and transmission unit 56 mounted externally on the wall 52 below the motor and transmission unit 50 for the agitator 44. The rotational speeds of the motor and transmission units 50, 56 are preferably independently adjustable. The rotation of the blades 46 of the agitator 44 moves the pellets 10 toward the center of the agitator chamber 38 so that, as the pellets 10 are loaded into the inlet section 36, the blades 46 agitate the pellets 10 and break up any agglomeration or blocking of the pellets 10 prior to introduction of the pellets 10 into the inlet section 40. The screw 42 is rotationally mounted within the auger assembly 18 for transfer of the pellets 10 from the particle feeder 16 to an outlet 58 of the auger assembly 18.

In one aspect of the invention, the particle feeder/auger assembly system 16, 18 advantageously is a Thayer PF-5 volumetric feeder, model number PF-5-6-4.8, available from Thayer Scale—Hyer Industries, Inc., Pembroke, Mass.

This type of volumetric feeder is described in Andrews U.S. Pat. No. 5,333,762, the entire disclosure of which is incorporated herein in its entirety by reference. The feeder frame of the feeder section 36 is formed of 304 stainless steel, mill finish (2B), with the feeder section material which comes in contact with the pellets 10 being formed of electropolished 304 stainless steel. The feeder section 36 is constructed so as to meet Class I, Group C and D explosion proofing requirements. In order to meet these explosion proofing requirements, the motor 50 is a high-efficiency, inverter-duty, 406 volt, 3 phase, constant-speed AC motor from the Reliance Electric Company. The screw length from the center line 35 of the particle feeder inlet port 34 to the center line 59 of the outlet 58 is 72 inches; if desired, an extension (not shown) may be provided, thereby allowing for a screw length from center line 35 to center line 59 of 84 inches.

The screw 42 includes a center shaft 60 and closed, helical flights 62 of uniform pitch P and outer diameter $D_s$. The pitch P of the screw 42 is six inches and the diameter $D_s$ of the screw 42 is 6 inches. The rotation of the screw 42 within the chamber or barrel 32 sweeps crests 64 of the helical flights 62 across an interior cylindrical surface 66 of the barrel 32. The inside diameter $D_c$ (or $D_B$) of the chamber or barrel 32 is approximately 6 inches so as to provide for a minimum allowable clearance between the crests 64 of the screw 42 and the interior surface 66 of the barrel 32 during rotation of the screw 42. The motor 56 is a model number 1305, 2.0 horsepower, 460 volt, 3 phase, 60 Hz, variable frequency, AC motor from the Allen Bradley Company. The particle feeder/auger assembly system 16, 18 further includes an extension for an Allen Bradley Human Interface Module (HIM). The HIM is mounted on the front of the drive enclosure, and includes an analog speed potentiometer having a feed-rate set point ranging from 4 to 20 milliamperes.

Figure 3:
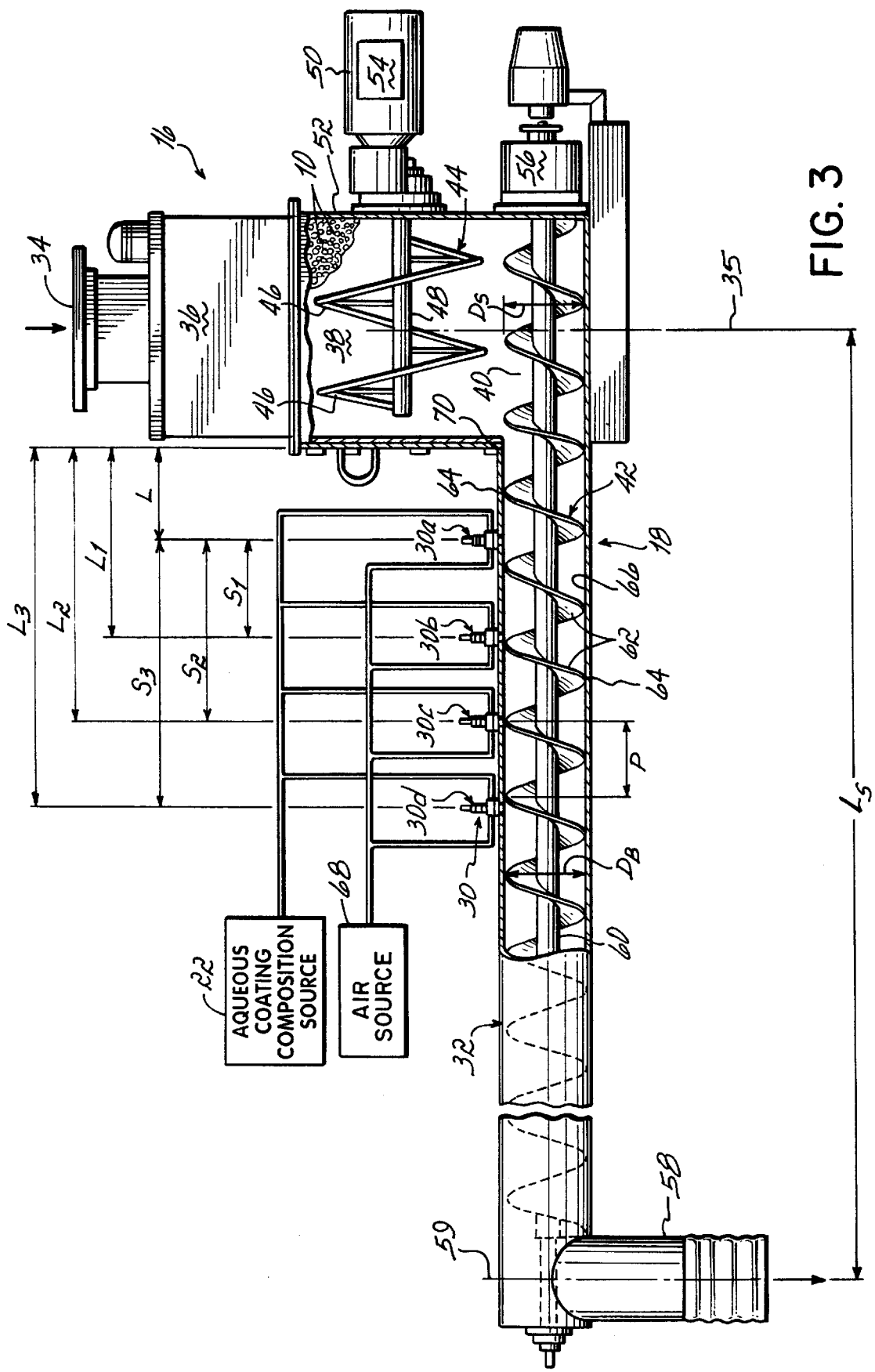

The particle/feeder auger assembly system 16, 18, as shown in FIGS. 3 and 4, includes at least one, preferably two, and more preferably four, spray head(s) 30 mounted to the barrel 32 of the auger assembly 18. Barrel 32 is drilled at specific locations for receiving the spray head(s) 30, and a mounting and locking member is supplied as described below to facilitate flush mounting at the interior cylindrical surface 66 of the barrel 32. Each spray head 30 is operatively coupled to a supply source 22 of the aqueous coating composition 12, and to an air source 68 which assists in atomizing the composition 12, so that the composition 12 is delivered through the spray head(s) 30 into the barrel 32 in an atomized state.

When more than one spray head 30 is used, an important feature of the invention is the spacing of the multiple spray heads 30 relative to each other and relative to the pitch P of the screw 42. For example, when multiple spray heads 30 are oriented in a straight line parallel with the longitudinal axis of the barrel, as shown in FIG. 3, a first spray head 30a is spaced 8 inches from a mouth 70 of the barrel 32 as identified by a distance L in FIG. 3. Likewise, a second spray head 30b is spaced 16 inches from the mouth 70 of the barrel 32 as identified by $L_1$. The third spray head 30c is spaced 23 inches, as identified by $L_2$, from the mouth 70 of the barrel 32 and, finally, the fourth spray head 30d is spaced 30 inches from the mouth 70, as identified by $L_3$. The spacing of the multiple spray heads 30 relative to each other is such that the spacing between any two of the spray heads 30 is not an integral multiple of the six-inch pitch P of the screw.

Additionally, the first spray head 30a is spaced a distance $S_1$, of 8 inches from the second spray head 30b. Likewise, the first spray head 30a is spaced a distance $S_2$ of 15 inches from the third spray head 30c and a distance $S_3$ of 22 inches from the fourth spray head 30d. As such, each of the spacings $S_1$, $S_2$, and $S_3$ are non-integral multiples of 6 inches, the pitch P of the screw 42. A comparison of the spacings of the other spray heads 30 relative to each other reveals that these spacings also are non-integral multiples of the pitch P. As one of ordinary skill readily will appreciate from this description, although the spacing of the spray heads 30 relative to each other is greater than the pitch P, the spacing between spray heads may be less than the pitch P, or may be a mixture of spacings, some of which are greater than, and some of which are less than, the pitch, while still providing non-integral multiples of the pitch P.

As can be further appreciated by one of ordinary skill from the above description, the particle feeder/auger assembly system 16, 18 performs the function of conveying and mixing substrate particles 10 while an aqueous coating composition 12 is being uniformly applied via one or more spray heads 30. Preferably, the substrate particle feed rate, aqueous coating composition feed rate, spray pressure, chamber (barrel) length, and screw rotation rate are adjusted to provide for a uniformly coated particle at the outlet of the chamber (barrel). It can be further appreciated though not preferred, that the thickness of the crests of the screw and the spray head orifice spray pattern can be adjusted so that the crests may pass through the spray pattern of at least one spray head while still providing application of aqueous coating composition to the substrate particles. Thus, the spray head spacing relative to the position of the crests of the screw is not a limitation on the scope of the invention. It can be still further appreciated that the screw may have a variable pitch.

One of the many benefits of the multiple spray head spacing aspect of the invention is that, although each spray head nozzle orifice (orifice to be discussed below) may become temporarily masked by a flight crest 64 as the screw 42 rotates, at least one of the spray nozzle orifices always will be free of a flight 64. Therefore, the flow of the coating composition 12 through the spray heads 30 into the barrel 32 is never completely interrupted. It should be understood by one of ordinary skill in the art that the particular numerical spacings of the spray heads 30 and dimensions of the screw 42 of the particle feeder/auger assembly system 16, 18 of FIG. 3. are not limitations on the scope of the invention.

Referring to FIG. 4, three spray heads 30 according to one version of the invention are shown, in which one crest 64 temporarily is positioned so as to at least partially block the spray head 30c; however, due to the spacing of the spray heads 30 relative to each other, as well as the pitch P of the screw 42, the other two spray heads 30a, 30b each are unobstructed, thereby enabling the composition 12 to flow through these spray heads 30a, 30b onto the pellets 10 within the barrel 32 without any temporary masking by the flight crests 64. Each spray head 30 includes an air-atomizing nozzle and a wall-mounting adapter 72, both of which are commercially available from the Spraying System Company of Wheaton, Ill. as Model 4JCO and 3376 with ¾ inch NPT (M) connection, respectively. The spray head 30 includes a clean-out needle assembly 74 mounted to a nozzle body 76, an air conduit 68a and port 78a for delivering air to the nozzle body 76, from the air source 68 and an aqueous coating composition conduit 22a and port 78b for delivering aqueous coating composition 12 to the nozzle body 76 from the composition source 22. An air cap 80 is concentrically seated onto a fluid cap 82 which is mounted to the nozzle body 76 opposite from the needle assembly 74. The air cap 80 and fluid cap 82 are directed toward a threaded opening 84 in the barrel. The fluid cap 82 includes a spray discharge nozzle having an orifice 87 and being seated within the surrounding air cap 80.

Preferably, each spray head 30 is mounted to the barrel 32 such that the discharge nozzle orifice 87 is substantially flush with the interior surface 66 of the barrel 32, thereby providing for minimal clearance between the orifice 87 and a corresponding flight crest 64 of the screw 42. This feature minimizes and even avoids formation of solids build-up inside the auger assembly while still permitting rotation of the screw 42. As such, auger assembly 18 down-time, repair and cleaning is minimized, and the particles ejected from the nozzle 86 are more uniformly coated onto the pellets 10 with the desired concentration.

A retaining ring 88 is threadably mounted onto a forward portion of the fluid cap 82 and securely retains the air cap 80 therein. In addition, the spray head 30 is securely mounted to the barrel 32 by the wall mounting adapter 72. The wall mounting adapter 72 provides for the accurate positioning of the nozzle 86 relative to the interior surface 66 of the barrel 32 and the crests 64 of the screw 42 as previously described. The wall mounting adapter 72 is generally in the form of a ferrule having external threads 90 for mating with the threaded opening 84 in the barrel 32. The wall mounting adapter 72 also includes internal threads 92 for coupling to external threads 94 on the retaining ring 88 of the spray head 30 and thereby securely mounting the spray head 30 to the side wall of the barrel 32.

As the pellets 10 are advanced within the barrel 32 of the auger assembly 18, the aqueous coating composition 12 is sprayed through the spray heads 30, thereby coating the pellets 10. Additionally, the spray heads 30 are advantageously spaced relative to one another and located relative to the pitch P of the screw 42 within the auger assembly 18 to avoid completely blocking or interrupting the flow of aqueous coating composition 22 onto the pellets 10 at any particular instance in time during rotation of the screw 42. After the pellets 10 pass the spray heads 30, the rotation of the screw 42 continues to advance the coated pellets toward the outlet 58 of the auger assembly 18 for subsequent particle drying and cooling in a fluidized bed or the like.

As shown and described herein, the spray head(s) 30 is/are mounted onto the barrel 32 of the auger assembly 18. Nevertheless, it should be appreciated that the pellets 10 may be coated with the composition 22 at other stages or locations within the scope of this invention. For example, spray head(s) 30 may be mounted on other parts of the auger assembly 18 such as the outlet 58 or other components such as the particle feeder 16, the fluidized bed 24 or other pellet handling/processing components.

The fluidized bed preferably is constructed so that the wall construction along the edges of the horizontal portion of the bed is radiused, which facilitates motion of the coated pellets up the radiused vertical wall portion of the bed followed by collapse onto the particles in the horizontal portion of the bed. This motion has been found beneficial in efficiently drying the coated pellets. Although any suitable fluidized bed may be used, particularly beneficial results may be achieved using the Model FBP-1405 Fluid Bed Processor with Self-Contained Vibratory Motor from Carman Industries, Inc., Jeffersonville, Ind. Altenatively, a vibrating-drum style of fluidized bed as available form General Kinematics of Chicago, Ill. may be used to advantage.

Operating Examples

The following detailed operating examples illustrate the teachings of the invention in its most preferred form. The principles of this invention, the operating parameters and other obvious modifications thereof, will be further understood in view of the following detailed examples.

General Methods

Several of the illustrative examples provided below include stick-temperature values for the resulting coated particles which demonstrate the improvement in anti-block properties of the coated particles. The term "stick temperature" refers to the maximum temperature at which the coated particles still are free-flowing, as determined using a stick-temperature test method developed and practiced by Equistar Chemicals, LP.

Stick temperature is determined using a stick temperature apparatus available from MBS Associates, Inc. of Cincinnati, Ohio under the product code number ONEQS002. The apparatus includes a control unit operatively connected to a sample tube, with the tube being mounted on a rotatable axis, thereby allowing the tube to be oriented in an upright position as well as in a dumping position. The control unit includes a temperature controller, an air inlet and an air outlet, timers to regulate air cycles, a heater for use in heating the sample tube, an air pressure regulator, and a flow meter to regulate the flow of air through the control unit and into the tube. In addition, the tube itself includes a removable, weighted top. The sample tube is formed of stainless steel and has an inner diameter of $1\frac{5}{8}$ inches and a height of 12 inches. The weighted top assists in applying pressure to the particular polymer contained within the sample tube, and is cylindrical in shape, having one larger diameter cylinder connected directly and coaxially to a smaller diameter cylinder, with the smaller diameter portion being sized so as to be positioned part way into the sample tube through an opening in the top of the sample tube. In more detail, the weighted top is $8\frac{1}{4}$ inches tall, with the larger diameter portion having a height of 5 inches, the smaller diameter portion having a height of 5 inches, and the smaller diameter portion having a height of $3\frac{1}{4}$ inches. In addition, the diameter of the larger diameter portion is $3\frac{1}{2}$ inches, whereas the diameter of the smaller diameter portion is $1\frac{1}{2}$ inches.

Prior to running the stick test, the control unit is plugged into a 110 volt outlet, and the air in-port is connected to a supply of ambient air. The control unit's air regulator then is turned on to the set level (i.e., 20–22 psig), and the unit's flow meter is set to a level of 33 liters per minute. At this point, the unit's control panel is turned on and the temperature controller is set to the desired point, a point which varies as a function of the particular material being tested. In the vast majority of testing situations, this desired starting point is 50° C. Next, the weighted top is positioned in place on the sample tube, the heater switch is turned on to power the heater, and the timers are set for 900 seconds of heated air, 300 seconds of cool air, and 60 seconds of dumping sequence. The weighted top then is removed from the stainless steel tube, and the tube is lined with a 6 inch by 11 inch sheet of polyethylene terephthalate (PET) film available from Pilcher Hamilton under the product name Phanex IHc Polyester Film.

At this point, 180 grams of the particular material to be tested is weighed out. When the temperature of the sample tube is stabilized at the desired set point, the material is charged, (i.e., loaded) into, the sample tube. The weighted top is once again positioned on the top of the sample tube, and the test is begun by turning on the timer switch on the control panel. After both the heating and cooling timers have reached their set points, the control unit sounds an alarm. This alarm may be silenced by pressing the alarm button on the control panel of the unit. Next the weighted top is removed from the sample tube. The air line, which has been connected via a quick-connect coupling to the bottom of the tube, is disconnected from the tube, the safety pin is removed from the lever which is used to turn the sample tube in to a dumping position, and the tube is inverted for 60 seconds, with the material exiting the tube being captured in a conventional weighing cup for subsequent measurement.

After the 60 second dumping period, the control unit will sound another alarm which is silenced by pressing the alarm button on the control panel of the unit. At this 60-second point, the opening of the tube is covered to prevent further discharge from the tube, and the tube is returned to its original, upright position. In addition, the alarm is reset by pressing the alarm button. Next, the pellets which were captured in the weighing cup are weighed, and the percentage of the material recovered is calculated using the formula [weight out/weight in] ×100. At this point, any pellets remaining in the sample tube are removed using a clean-out apparatus. This particular apparatus is 18 inches long, 1⅜ inches wide, and 0.098 inch thick. The air line is then reconnected to the sample tube, and the heat cycle is reset by turning off the timer switch on the control unit.

If more than 90.0% of the pellets is recovered, the test is repeated until less than 90.0% of the pellets is recovered in the 60 second time period. In each repeat test, the sample tube is charged with new, identical material, and the temperature of the sample tube is increased from the temperature of the immediately preceding test by 2° C.

If less than 90.0% of the pellets is recovered, the test is repeated with a new sample until greater than 90.0% is recovered in the one minute time period. In performing this retesting, the temperature of the sample tube is decreased by 2° C. from the temperature used for the immediately preceding test.

The official "stick temperature" is the highest temperature, in degrees Celsius, at which 90.0% or greater of the sample material is recovered.

The coating particles applied to the substrate particles tend to remain in place even after being subjected to vibratory and abrasive forces as during storage and transport. This tendency of the coating particles to remain on the surface of the substrate particles is evaluated by a methanol wash test, developed and practiced by Equistar Chemicals, LP. The methanol wash test is performed by weighing 100 grams, to the nearest 0.1 gram, of the particular polymeric coated particles to be tested, and transferring the particles to a 500 milliliter Erlenmeyer flask. 50 milliliters of methanol is added to the flask, the flask is seated with a stopper, and shaken vigorously for 15 to 20 seconds to disperse the coated particles in the methanol.

Next, the suspension is decanted through a porcelain filter funnel containing a fiber glass filter which has previously been dried at 100 degrees Celsius and weighed to the nearest 0.1 milligram. The 50 milliliter wash step and the decanting step are continued until the methanol in the Erlenmeyer flask is observed by the naked eye to be free of suspended polymeric coating particles. At this point, the porcelain filter funnel containing the fiberglass filter and entrapped coating particles is rinsed with methanol and dried for one hour at 65° C. Then, the crucible is cooled in a desiccator and weighed to the nearest 0.1 milligram to determine the total weight of these polymeric coating material removed from the coated particle. The "weight percent removed" is calculated by the following equation: [weight of polymeric coating particles recovered (grams/initial weight of coated polymeric particle sample) grams] ×100.

Except as otherwise noted, all pellets prepared for use in the examples below were formulated with 500–750 ppm antioxidant, typically BHT (butylated hydroxytoluene) or octadecyl-3,5-di-tert-butyl-4-hydroxyhydrocinnamate such as Irganox® 1076 from Ciba Geigy, introduced into the extruder barrel prior to pelletization as a 25% solids slution by weight in mineral spirits.

EXAMPLE 1

Formation of Coated Pellets Using the Auger System

In providing the coated pellets, 1 lb of deionized water was added to 200 lb of ethylene-vinyl acetate copolymer (EVA) pellets as a pre-wetting agent used to prepare the surface of the pellets prior to the application of the coating. The EVA pellets used had a melt index of 410 g/10 min, a 28% vinyl acetate content by weight, and are available from Equistar Chemicals, LP, Cincinnati, Ohio. 200 lb of the EVA pellets were fed through the auger system, during which time the pellets were coated with an aqueous coating composition of an EVA powder dispersed in an emulsion. The EVA powder used was Microthene® FE 532-00 (9MI, 9% VA) available from Equistar Chemicals, LP, Cincinnati, Ohio, and the emulsion in which the Microthene EVA powder was dispersed was an Aquastab® emulsion from the Eastman Chemical Company, Kingsport, Tenn., as described in conjunction with Table 1 above.

The aqueous coating composition was delivered through the flush-mounted spray nozzles of the auger system onto the EVA pellets moving through the auger system. The auger system was a lab scale unit which utilized two spray heads spaced at a non-integral multiple of the pitch of the screw. The barrel diameter was 4 inches. The auger system included an agitator bar in the hopper.

The coating composition contained 40 weight % Microthene® FE 532-00, had a viscosity of 300 centipoise (cP), and was applied with an air pressure of 40 pounds per square inch gauge (psig) in order to spray the coating composition in an atomized form. In addition, the aqueous coating composition was applied at a 1% concentration, resulting in a coating particle concentration of about 4000 parts per million (ppm), ie., 0.40 weight % basis 100% solids to 200 lb of pellets. The coated pellets subsequently were passed to a fluidized drying bed, where the coated pellets were dried on a Process Control Corporation static fluid bed using room temperature air at an airflow rate in the range of about 300 to 500 standard cubic feet per minute (scfm). The airflow was generated by a trim blower from North American Manufacturing. The collected sample then was analyzed for stick temperature and pellet performance . Whereas the initial EVA pellets had a stick temperature of 30° C., the coated EVA pellets now had a stick temperature of 52° C. The increase in stick temperature was 22° C., resulting in an improvement of 73%. Even after washing the coated pellets 6 times using the methanol wash test described above, the coated pellets still had a stick temperature of about 36° C.

EXAMPLE 2

Drying the Coated Pellets

After the pellets coated in Example 1 had been formed but not yet dried, they were temporarily stored 5 days in a Gaylord container and subsequently dried in a vibrating, fluidized bed. The material was run through the bed at a rate of about 550 pounds per hour, with the air temperature being about 120° F. The dried, coated particles then were stored in an Equistar Chemicals, LP. facility in a clean Gaylord container for subsequent experimentation.

EXAMPLE 3

Testing the Anti-Block Characteristics

Approximately four months after storing the dried, coated pellets of Example 2 in the Gaylord container, a sample of these coated pellets was removed from the Gaylord container using a "sample thief". The sample thief is a tube which is about 3.5 feet long and which has several openings through which the coated pellets may enter into the interior of the tube. In addition, the sample thief is capable of holding about 100 grams of coated pellet material. In performing this example, the sample thief was inserted into the Gaylord container five different times at five different locations, with sample collected for stick temperature testing. No problems were encountered with use of the sample thief, even when the sample thief was inserted to the bottom of the Gaylord container.

EXAMPLE 4

Stick Temperature Test of the Coated Pellets of Example 3

A stick temperature test was performed on a sample of coated pellets which had been collected in Example 3. After four months storage, these coated pellets exhibited a stick temperature of 52° C. The increase in stick temperature was 22° C., resulting in an improvement of 73%.

GENERAL METHOD FOR EXAMPLES 5–7

Formation of EVA Pellets Coated with a Coating Composition

Ultrathene® UE 653-04 EVA pellets with a 410 melt index (MI) and 28% vinyl acetate content (VA) and an uncoated stick temperature of approximately 30° C. were coated with the aqueous coating composition described in detail in Example 1. In each of Examples 5–7, the appropriate amount of the aqueous coating composition described in Example 1 was diluted with a small amount of deionized water in order to form a diluted aqueous coating composition which would provide the desired parts per million (ppm) of polymeric coating particles remaining on the pellets after the coated pellets had been dried. In order to coat the pellets, 1000 grams of Ultrathene® UE 653-04 pellets were placed into a plastic bag, the appropriate amount of diluted aqueous coating composition was poured into the plastic bag, and the combined contents of the bag were shaken for about five minutes to enable the aqueous coating composition to contact all of the pellets. The contents of the plastic bag then were dried in an open pan at room temperature and atmospheric pressure.

EXAMPLE 5

EVA Pellets Coated with 3000 ppm EVA Powder 7.5 grams of the aqueous coating composition were diluted with a small quantity of deionized water in order to form a diluted aqueous coating composition which would achieve a coating level of 3000 ppm on the EVA pellets. The resulting coated pellets had a stick temperature of 48° C. The increase in stick temperature was 18° C., resulting in an improvement of 60%.

EXAMPLE 6

EVA Pellets Coated with 4000 ppm EVA Powder 10.0 grams of the aqueous coating composition were diluted with a small quantity of deionized water in order to form a diluted aqueous coating composition which would achieve a level of 4000 ppm of polymeric coating particles on the resulting coated pellets. The resulting coated pellets had a stick temperature of 46° C. The increase in stick temperature was 16° C., resulting in an improvement of 53%.

EXAMPLE 7

EVA Pellets Coated with 5000 ppm EVA Powder 12.5 grams of the aqueous coating composition were diluted with a small quantity of deionized water in order to form a diluted aqueous coating composition which would achieve a polymeric coating particle level of 5000 ppm. The resulting coated pellets had a stick temperature of 50° C. The increase in stick temperature was 20°, resulting in an improvement of 67%.

EXAMPLE 8

Results of Methanol Wash Test

A sample of coated pellets formed as described in Example 1 were subjected to the methanol wash test described in the General Methods section. The tenacity of the polymeric coating particles for the polymeric substrate pellets was such that the methanol wash had to be performed 7 times before the methanol was observed to be free of suspended polymeric coating particles.

Thus there is disclosed a coated particle, method of making the coated particle, and equipment for facilitating manufacture of the coated particle. In addition to the advantages of the coated particle previously described, the coating imparts an enhanced slipperiness to the coated particles which permits denser packing of polymeric particles which have received the coating. Thus, a greater weight of coated particles may be stored in a fixed volume compared to particles which did not receive the coating.

What is claimed is:

1. A system for making coated polymeric particle having improved anti-block characteristics, comprising:

a chamber having an interior sidewall, an interior space, and an inlet spaced from an outlet;

a rotatable screw, at least a portion of the screw being positioned within the chamber interior space, the screw having a shaft and at least one helical flight extending radially outward from the shaft, the helical flight having a crest and a pitch;

a rotational drive operatively coupled to the screw;

a first spray head in fluid communication with the interior space of the chamber, the first spray head having a discharge nozzle including an orifice, with the orifice being substantially flush with the interior sidewall of the chamber; and a second spray head in fluid communication with the interior space of the chamber.

2. The system of claim 1 wherein the second spray head in fluid communication with the interior space of the chamber and having has a discharge nozzle including an orifice, the second discharge nozzle orifice being positioned along the interior sidewall such that when the crest of the helical flight passes across the first discharge nozzle orifice, the crest does not pass across the second discharge nozzle orifice.

3. The system of claim 2 wherein the first and second spray heads are oriented in a straight line parallel to the longitudinal axis of the chamber.

4. The system of claim 1 wherein the interior sidewall is substantially circular in cross-section.

5. The system of claim 4 wherein the interior sidewall has an inside diameter ($D_c$) and the screw helical flight has an outside diameter ($D_s$), the outside diameter being substantially the same as the inside diameter.

6. The system of claim 1 further comprising an agitator in fluid communication with the chamber.

7. The system of claim 1 further including a coated polymeric pellet drying apparatus in fluid communication with the chamber.

8. The system of claim 1 wherein the second spray head has a discharge nozzle including an orifice, with the orifice being substantially flush with the interior sidewall of the chamber.

* * * * *

UNITED STATES PATENT AND TRADEMARK OFFICE
CERTIFICATE OF CORRECTION

PATENT NO. : 6,328,798 B1  Page 1 of 1
DATED : December 11, 2001
INVENTOR(S) : David O. Bostrom et al.

It is certified that error appears in the above-identified patent and that said Letters Patent is hereby corrected as shown below:

Column 1,
Line 62, "pack (aging" should read -- packaging --.

Column 11,
Line 65, "as available form" should read -- as available from --.

Column 13,
Line 52, "seated" should read -- sealed --
Line 56, "fiber glass" should read -- fiberglass --.
Line 66, "these" should read -- the --.

Column 14,
Line 10, "slution" should read -- solution --

Column 15,
Line 5, "stored in an Equistar chemicals, LP. facility in a . . ." should read -- stored in an Equistar Chemicals, LP, facility in a . . . -- .

Column 16,
Line 48, "A system for making coated polymeric particle having . . ." should read -- A system for making coated polymeric particles having . . . --.
Line 66, "The system of claim 1 wherein the second spray head in fluid communication with the interior space of the chamber and having has a discharge . . ." should be -- The system of claim 1 wherein the second spray head is in fluid communication with the interior space of the chamber and has a discharge . . . --.

Signed and Sealed this

Sixteenth Day of July, 2002

*Attest:*

JAMES E. ROGAN
*Attesting Officer*   *Director of the United States Patent and Trademark Office*